Oct. 31, 1967  J. A. ORAL  3,349,861
TRACTION DEVICE FOR MOTOR VEHICLES
Filed Oct. 23, 1965  3 Sheets-Sheet 1

INVENTOR
Jaroslav Alex Oral

BY

ATTORNEY

Oct. 31, 1967  J. A. ORAL  3,349,861
TRACTION DEVICE FOR MOTOR VEHICLES
Filed Oct. 23, 1965

INVENTOR
Jaroslav Alex Oral

BY

ATTORNEY

Oct. 31, 1967 J. A. ORAL 3,349,861
TRACTION DEVICE FOR MOTOR VEHICLES
Filed Oct. 23, 1965 3 Sheets-Sheet 3

INVENTOR
Jaroslav Alex Oral
BY
ATTORNEY

United States Patent Office 3,349,861
Patented Oct. 31, 1967

3,349,861
TRACTION DEVICE FOR MOTOR VEHICLES
Jaroslav Alex Oral, 5307 Gaston Ave.,
Dallas, Tex. 75214
Filed Oct. 23, 1965, Ser. No. 503,360
2 Claims. (Cl. 180—9.54)

ABSTRACT OF THE DISCLOSURE

The invention contemplates an improved traction device for use on paved surfaces and which comprises a crawler type arrangement including an endless, comparatively smooth surfaced flexible belt which encircles a driven wheel and extends rearwardly thereof, relative to the direction of movement of the vehicle in a forward direction, in yieldable, spring tensioned frictional engagement with the peripheral surface of the wheel and with a supporting surface.

---

This invention relates to a traction device for automotive vehicles, and it has particular reference to novel means as hereinafter described for application primarily to the driven wheels of ordinary passenger automobiles and small trucks to provide improved traction therefor, as in sub-freezing weather, in the presence of ice and snow whereby streets and highways which may have become covered therewith present glazed, smooth, and sometimes slick surfaces and are difficulty negotiable without the aid of chains or other like devices.

The use of tire chains on automotive vehicles for the purpose of providing improved traction on ice covered streets and highways is not entirely satisfactory for the reason that a bumpy ride results as the several circumferentially spaced portions of a chain which extend transversely of a tire to which the chain is applied strike the pavement successively and repeatedly in a predetermined time cycle corresponding to the speed of the vehicle, and for the further reason that tire chains, like lugs on the wheels of tractor vehicles, may damage the surface of the pavement, particularly after a thaw, and their use may be incompatible with continued maintenance of the pavement in its original serviceable condition.

A prime object of the invention is that of providing a traction device for automotive vehicles as described which is adapted to provide substantially improved traction therefor while at the same time insuring a smooth, comfortable ride and also contributing to the long, useful life of streets and highways on which the device may be employed.

A further object of the invention resides in the provision of an improved traction device as described which is characterized by its simplicity and its sturdy, light weight construction, and which may be readily applied to a driven wheel and removed therefrom by one man unassisted, consists of comparatively few parts requiring little space for storage thereof when not in use, is convenient and efficient in operation and almost indestructible, and is further distinguished by its attractive, functional appearance and may be manufactured inexpensively.

While the foregoing objects are paramount, other and lesser objects will become apparent as the description proceeds, when considered in connection with the appended drawings wherein.

Figure 1:
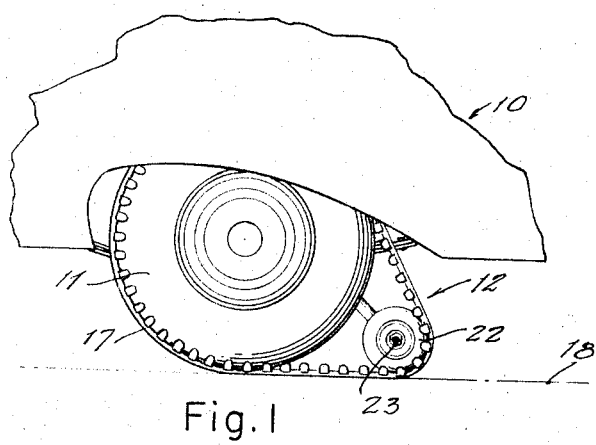
FIGURE 1 is a side elevational view showing a driven wheel of an automobile, shown fragmentarily, having applied thereto a traction device embodying the invention, showing the traction device in one of its operative positions.
Figure 2:
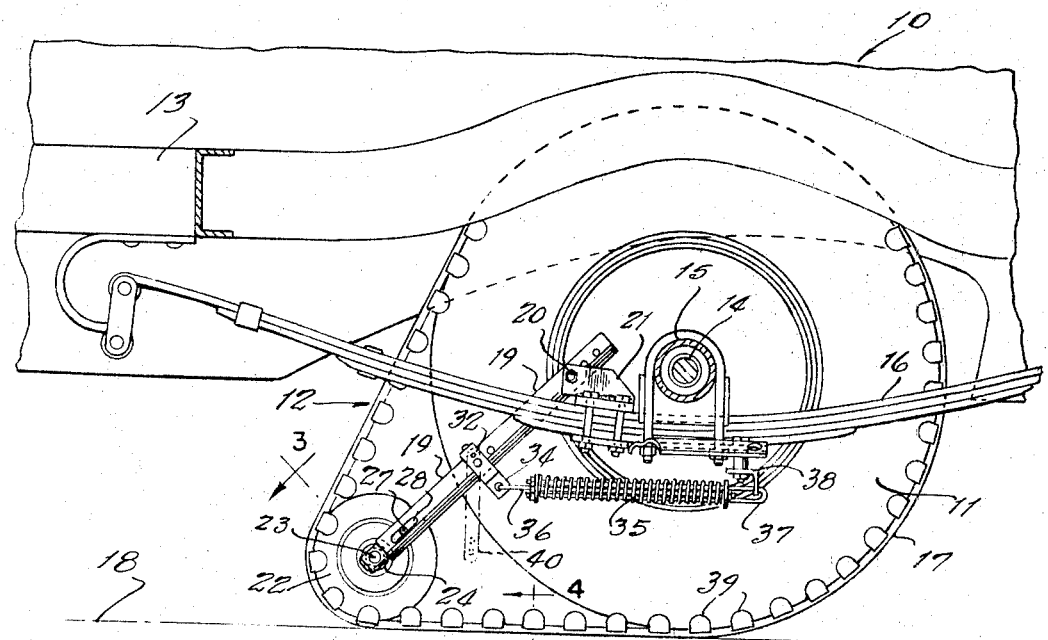
FIGURE 2 is a side elevational view on an enlarged scale showing the traction device of the invention as seen from the side of the wheel opposite the side shown in FIGURE 1, and showing fragmentarily the frame of the automobile, the driven axle on which the wheel is mounted, the axle housing, and a spring whereby the frame is suspended from the axle housing.

Referring to FIGURES 1 and 2 of the drawing, the numeral 10 designates generally an automobile, shown fragmentarily, having a driven wheel 11, and the numeral 12 indicates generally a traction device embodying the invention which is applied to the wheel 11 as hereinafter described.

As shown best in FIGURE 2, the automobile 10 has a frame, indicated generally by the numeral 13, and has a driven axle 14 on which the wheel 11 is mounted. An axle housing 15, which surrounds the axle 14, has a spring 16 mounted thereon whereby the frame 13 is suspended from the axle housing 15, in the usual manner.

The traction device 12 includes an endless, comparatively smooth surfaced flexible belt, indicated generally by the numeral 17, which encircles the wheel 11 and extends rearwardly thereof, relative to the direction of movement of the automobile 10 in a forward direction, and means as hereinafter described whereby the belt 17 is yieldably secured in spring tensioned, frictional engagement with the peripheral surface of the wheel 11 and with a supporting surface, indicated by the line 18.

An elongated tubular member 19 is pivotally and adjustably connected near one of its ends, as at 20, to a bracket, indicated generally by the numeral 21, which as shown is clamped to the top side of the spring 16 immediately adjacent the axle housing 15, rearwardly thereof, whereby the tubular member 19 is movable pivotally about a horizontal axis, in laterally spaced relation to the wheel 11 and the belt 17.

Figure 3:
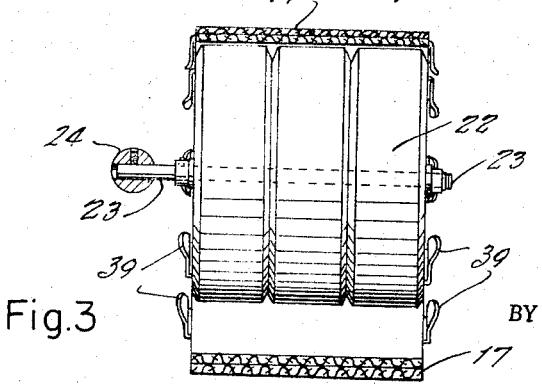
FIGURE 3 is a fragmentary sectional view on an enlarged scale taken on the line 3—3 of FIGURE 2.
Figure 5:
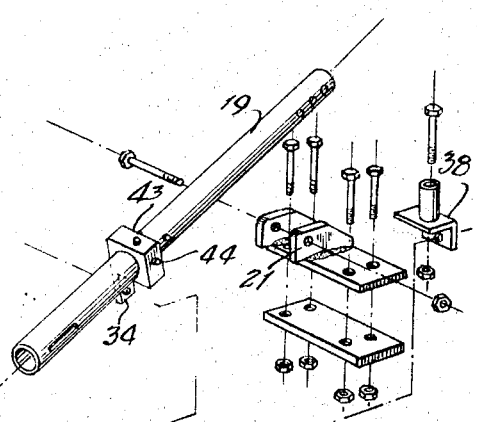
FIGURE 5 is an exploded perspective view showing the traction device of the invention in a detached, partially disassembled condition.
Figure 5:
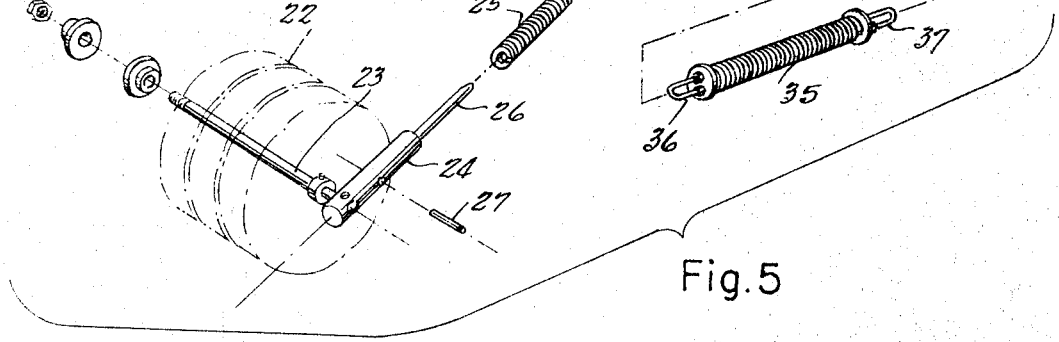
Figure 6:
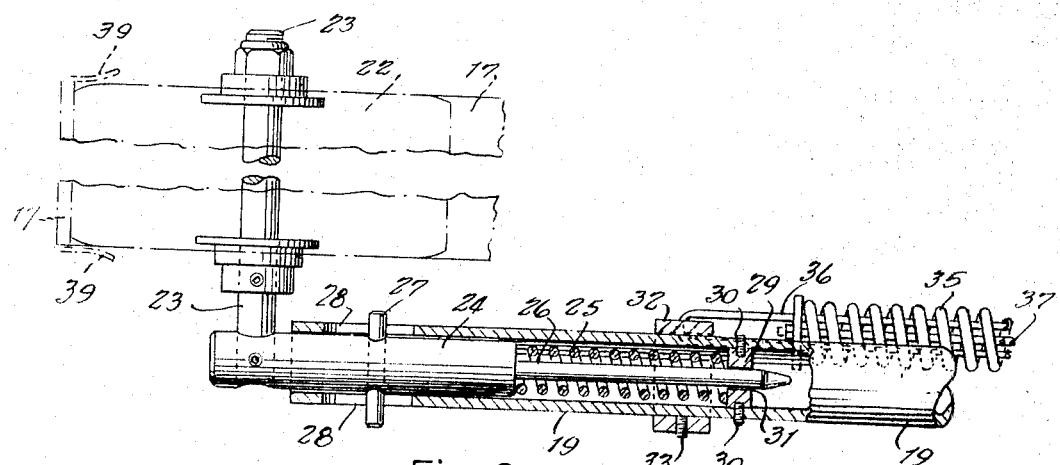
FIGURE 6 is a fragmentary view on an enlarged scale, partly broken away to show details of construction, showing portions of the traction device in its assembled but detached position.
Figure 7:
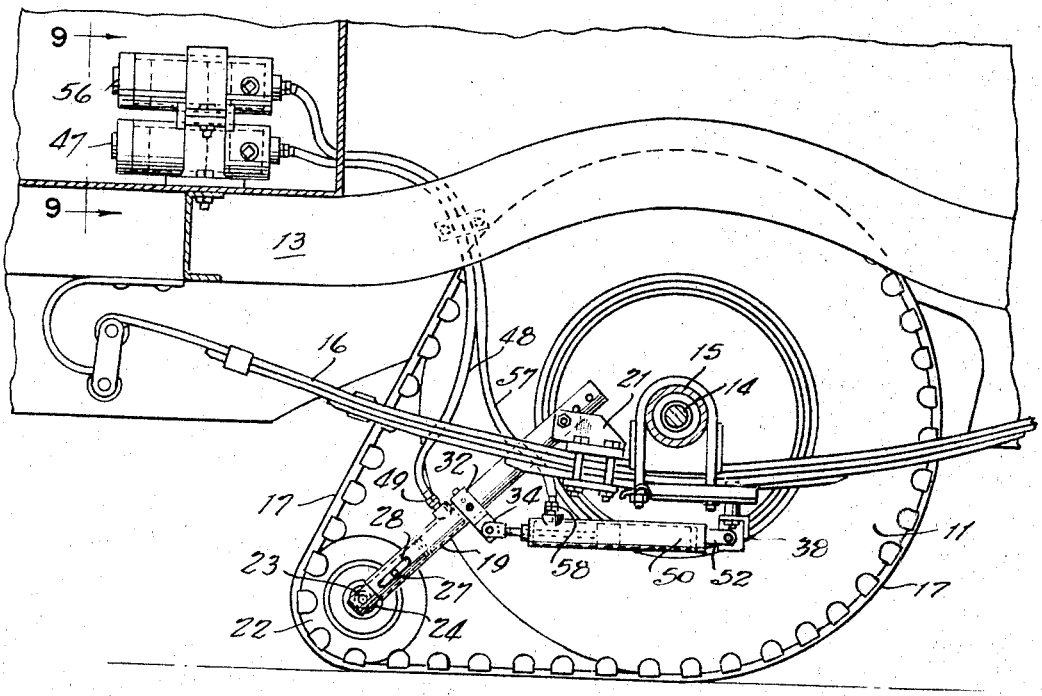

A plurality of rollers 22, which are substantially smaller than the wheel 11 and which have their peripheral surfaces in frictional engagement with one side of the belt 17, as shown in FIGURES 1 to 3, are journaled on a common axle shaft 23, in side by side relation to each other, and are removably connected thereto as shown in FIGURES 5 and 6.

One end of the shaft 23 extends through the outer end of a plunger element 24 which is slidably embraced by the tubular member 19 at its free end and is biased to its extended position, shown in FIGURES 2 and 6, by a compression spring 25 internally of the member 19 and surrounding a spindle 26 formed on the inner end of the element 24. A pin 27 is arranged transversely of the plunger element 24, and spaced from its outer end, to project through opposing slots 28 in the tubular member 19 to prevent the plunger element 24 from rotating therein but permit it to be reciprocated longitudinally thereof.

The spring 25 within the tubular member 19, while bearing at one end against the inner end of the plunger element 24, engages a discular element 29 secured by screws 30 in the tubular element 19 and the spindle 26 of the plunger element 24 projects through a central aperture 31 in the discular element 29 and functions as a guide for the member 24.

A bracket 32 is secured around the tubular element 19 by a set screw 33, as shown in FIGURES 2, 5 and 6, and has a lug 34 formed therewith to which is attached one end of a compression spring 25 by one of a pair of links 36 and 37 arranged longitudinally through the spring 35, the opposite link 37 being secured to a bracket 38 bolted to the underside of the leaf spring 16 of the vehicle 10, as shown in FIGURE 2.

The tubular member 19 is inclined downwardly and rearwardly from its pivotal connection with the bracket 21 whereby the rollers 22, and a portion of the belt 17 which is passed over the rollers 22, and which yieldably engages the supporting surface 18, are positioned rearwardly of the wheel 11. Movement of the tubular member 19 in an upward direction about its pivotal connection with the bracket 21 is resisted by the action of the spring 35.

The arrangement above described is such that the belt 17 is adapted to be driven in response to rotation of the wheel 11 in either direction and presents a relatively larger surface area in opposing, frictional engagement with a supporting surface such as the surface 18 at any given moment, as compared to the portion of the peripheral surface of the wheel 11 which ordinarily engages a supporting surface at any one time.

Figure 4:
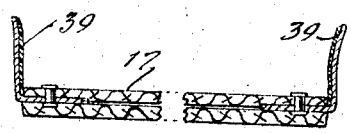
FIGURE 4 is a fragmentary sectional view on an enlarged scale taken on the line 4—4 of FIGURE 2.

As shown best in FIGURE 4, a series of right angular lugs 39, which are secured to opposite side edges of the belt 17, have one of their end portions in overlying engagement with the adjacent sides of the wheel 11 and the rollers 22, which have a combined width corresponding substantially to the width of the belt 17 and the width of the wheel 11 at its periphery. As shown, the end portions of the lugs 39 opposite said one of their end portions are embedded in the material of the belt 17, between the top and bottom surfaces thereof, and do not extend above or below the belt 17.

Figure 7:
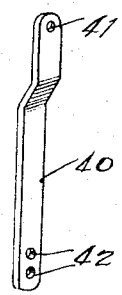
FIGURE 7 is a sectional illustration, similar to FIGURE 2, wherein the operative elements are hydraulically actuated, and showing the hydraulic reservoirs and fluid lines.

The numeral 40 designates generally a removable link, shown in FIGURE 7 and in broken lines in FIGURE 2, which has holes 41 and 42 in opposite ends thereof for engagement with corresponding projections 43 and 44 on the bracket 32 and one end of the shaft 23 whereby the plunger 24 may be secured temporarily in its retracted position relative to the tubular member 19, preparatory to applying the belt 17 to the wheel 11, and thereafter upon removing the belt 17 from the wheel 11.

Figure 8:
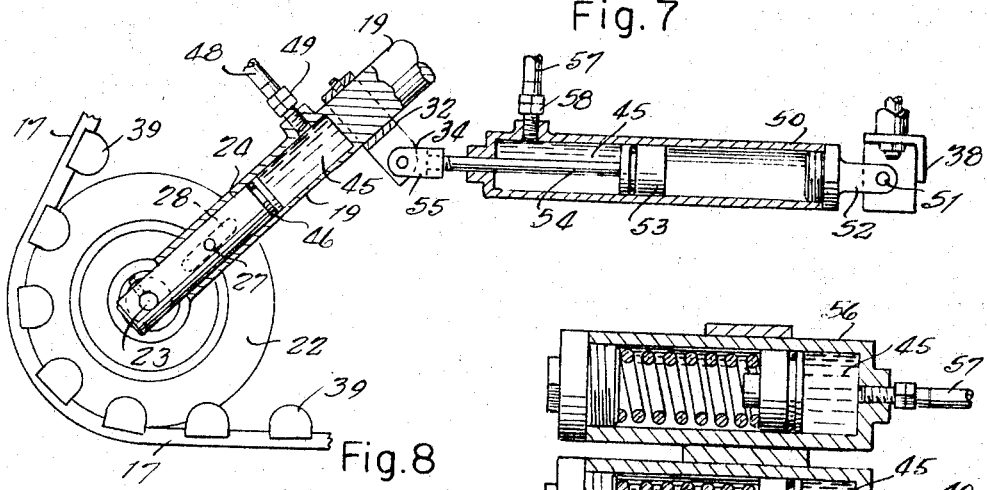
FIGURE 8 is an enlarged fragmentary illustration, generally in section, showing the hydraulic cylinders and pistons by which the traction device is yieldably restrained in operative position.

In FIGURES 7, 8, 9 and 10 is illustrated a modified form of the operative elements of the invention wherein the tubular member 19 contains a hydraulic fluid 45 which acts upon the inner end of the plunger element 24, the latter having fluid seal about its inner end in the form of an O-ring 46, to bias the plunger outwardly in the same manner as this member is operated by the spring 25 in the structure shown in FIGURES 2 and 6. The fluid 45 is provided from a reservoir 47 by way of a flexible tube 48 connected into the upper portion of the element 19 by a fitting 49, as shown in FIGURES 7 and 8.

Figures 9, 10:
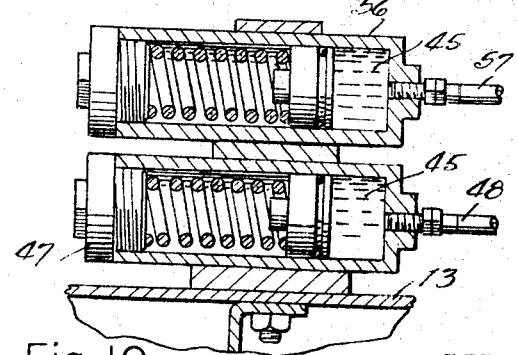
FIGURE 9 is an end view of the hydraulic reservoirs, on line 9—9 of FIGURE 7, and the retaining clamps therefor.
FIGURE 10 is an enlarged sectional view, on line 10—10 of FIGURE 9.

A cylinder 50 is pivotally attached by a pin 51 through a clevis 52 on the inner end thereof to the bracket 38 beneath the vehicle spring 16. A plunger 53 is operatively arranged in the cylinder 50 and has a plunger rod 54 on whose outer end is a clevis 55 which is pivotally attached to the lug 34 of the bracket 32 embracing the element 19. The fluid 45 in the cylinder 50 is supplied from a reservoir 56, adjacent to the reservoir 47, through a flexible tube 57 connected to the cylinder 50 by a fitting 58, as shown in FIGURES 7 and 8. The reservoirs 47 and 56 may be arranged in any desired manner, such as shown in FIGURES 7, 9 and 10, in some convenient part of the vehicle, as in the trunk.

The invention may be modified within certain limitations by persons skilled in the art without departing from the spirit and intent thereof or the scope of the appended claims.

What is claimed is:

1. In combination with an automotive vehicle having a driven wheel, and having a frame, an axle whereby said wheel is driven, an axle housing surrounding said axle, and a spring on said axle housing adjacent said wheel whereby said frame is supported on said axle housing, the combination of a flexible belt encircling said wheel and extending rearwardly thereof, an idler roller of smaller diameter than said wheel positioned rearwardly of said wheel and having the rearwardly extending portion of said belt passed around it, a horizontally extending shaft on which said roller is journaled, a bracket on said spring adjacent said axle housing, rearwardly thereof, and a spring tensioned, extensible link having one of its ends pivotally connected to said bracket for pivotal adjustment about a horizontal axis and extending downwardly and rearwardly relative thereto, between said spring and said wheel, and having its opposite end connected to said shaft, whereby said idler roller is biased downwardly and rearwardly, in opposing relation to said belt, whereby said belt is secured in yieldable, spring tensioned frictional engagement with the peripheral surface of said wheel and with a supporting surface.

2. The structure of claim 1, a second bracket connected to said spring tensioned, extensible link and spaced a predetermined distance apart from its pivotal connection with said first mentioned bracket, a third bracket on said spring adjacent said axle housing, forwardly thereof, and spring tensioned linkage connecting said second and third brackets and acting on said spring tensioned, extensible link to resist movement thereof in an upward direction about its pivotal connection with said first mentioned bracket.

References Cited
UNITED STATES PATENTS

| 1,697,915 | 1/1929 | Fast | 180—5 |
| 2,544,774 | 3/1951 | Bredl | 180—15 |
| 2,587,813 | 3/1952 | Bombardier | 305—29 |
| 2,654,639 | 10/1953 | Bombardier | 305—32 X |
| 2,722,280 | 11/1955 | Ballu | 180—9.5 |

FOREIGN PATENTS

| 193,743 | 12/1957 | Austria. |
| 91,462 | 4/1958 | Norway. |

BENJAMIN HERSH, *Primary Examiner.*

RICHARD J. JOHNSON, *Assistant Examiner.*